US011562447B2

(12) United States Patent
Kondratiev et al.

(10) Patent No.: US 11,562,447 B2
(45) Date of Patent: Jan. 24, 2023

(54) OPTIMIZING INTERFACES FOR MOBILE DEVICES

(71) Applicant: JetSmarter Inc., Fort Lauderdale, FL (US)

(72) Inventors: Vadim Kondratiev, Fort Lauderdale, FL (US); Mikhail Kirsanov, Fort Lauderdale, FL (US); Sergey Petrossov, Fort Lauderdale, FL (US)

(73) Assignee: JetSmarter Inc., Fort Lauderdale, FL (US)

( * ) Notice: Subject to any disclaimer, the term of this patent is extended or adjusted under 35 U.S.C. 154(b) by 998 days.

(21) Appl. No.: 16/106,227

(22) Filed: Aug. 21, 2018

(65) Prior Publication Data

US 2020/0065918 A1 Feb. 27, 2020

(51) Int. Cl.
*G06Q 50/14* (2012.01)
*G06Q 10/10* (2012.01)
*G06Q 10/02* (2012.01)
*G06F 3/04842* (2022.01)

(52) U.S. Cl.
CPC .......... *G06Q 50/14* (2013.01); *G06Q 10/025* (2013.01); *G06Q 10/1093* (2013.01); *G06F 3/04842* (2013.01)

(58) Field of Classification Search
CPC .. G06Q 50/14; G06Q 10/1093; G06Q 10/025; G06F 3/04842
See application file for complete search history.

(56) References Cited

U.S. PATENT DOCUMENTS

| 11,213,723 | B2* | 1/2022 | Bouck | A63B 24/0062 |
| 2004/0230451 | A1* | 11/2004 | Figa | G06Q 10/02 705/5 |
| 2014/0052714 | A1* | 2/2014 | Brodziak | G06F 16/9535 707/722 |
| 2017/0124489 | A1* | 5/2017 | Leavitt | G06Q 10/02 |

OTHER PUBLICATIONS

Jordan Kahn, "Review: Fantastical for iPhone, the calendar upgrade iOS 6 is missing", Nov. 29, 2012 (Year: 2012).*

* cited by examiner

*Primary Examiner* — Resha Desai
*Assistant Examiner* — Ismail A Manejwala
(74) *Attorney, Agent, or Firm* — Fish & Richardson P.C.

(57) ABSTRACT

Methods, systems, and apparatus, including computer programs encoded on a computer storage medium, that optimize interfaces to present information on mobile device displays. In one aspect, a method includes generating and providing, to a device, data that causes the device to present a status of one or more segments between a first location and a second location within a calendar interface. The calendar interface includes a calendar and, for each date having at least one existing segment, a respective non-textual segment indicator for each existing segment for the date. Each segment indicator is presented using visual feature(s) that represent the status of the segment represented by the segment indicator. A determination is made that the status of a given segment has changed to a second status. The visual feature(s) of the segment indicator for the given segment are visually updated within the calendar interface to represent the second status.

20 Claims, 11 Drawing Sheets

OPTIMIZING INTERFACES FOR MOBILE DEVICES

BACKGROUND

This specification relates to optimizing interfaces to present information on mobile device displays.

With the advent of smartphones and high speed mobile networks, people are increasingly using smartphones and other mobile devices to access data and perform tasks that they would have previously performed using computers with larger displays. However, smartphones and other mobile devices typically have small displays with limited space to present information and other content.

SUMMARY

In general, one innovative aspect of the subject matter described in this specification can be embodied in systems that include one or more front-end servers that interact, over a data communication network, with devices of clients and one or more back-end servers in data communication with the one or more front-end servers and that include one or more data processors. The one or more front-end servers or the one or more back-end servers can be configured to perform operations that include detecting, based on data received from of a device of a client, a selection to view segments between a first location and a second location. Data can be generated and provided to the device. The data can cause the device to present a status of one or more segments between the first location and the second location within a calendar interface. The calendar interface can include a calendar for a given date range that presents multiple dates and for each date having at least one existing segment between the first location and the second location, a respective non-textual segment indicator for each existing segment for the date. Each segment indicator can be presented using one or more visual features that represent the status of the segment represented by the segment indicator. A determination is made that the status of a given segment has changed from a first status to a second status. The one or more visual features of the segment indicator for the given segment are visually updated within the calendar interface to represent the second status. Other embodiments of this aspect include corresponding methods, apparatus, and computer programs, configured to perform the actions of the methods, encoded on computer storage devices.

These and other embodiments can each optionally include one or more of the following features. In some aspects, the segment indicator for each date having at least one existing segment between the first location and the second location includes a line presented under the date. In some aspects, determining that the status of a given segment has changed from a first status to a second status includes determining that the status of the given segment has changed from available to not available. Visually updating the one or more visual features of the segment indicator can include removing the segment indicator from the calendar interface. The calendar interface can include, for at least a portion of the dates, a required submission element that presents a required submission to claim a spot on a segment for the date.

In some aspects, the segment indicator for each segment is a dot presented within the calendar interface and below the date on which the segment is scheduled to depart. The calendar interface can include multiple dots presented below a particular date on which multiple segments are scheduled to depart. The operations can include providing data that causes the device to add a dot under a particular date within the calendar interface in response to client creation of a segment between the first location and the second location on the particular date.

In some aspects, adding the dot under the particular date can include determining that adding the dot to a row of dots under the particular date results in a number of dots presented in the row to exceed a maximum number of dots per row specified by a presentation constraint for the calendar interface and presenting the dot below the row of dots.

In some aspects, the device of the user detects client interaction with a particular date and in response to detecting the client interaction with the particular date, presents information for each segment scheduled to depart on the particular date. In some aspects, the one or more visual features used to present each segment indicator includes a color that represents the status of the segment. Each potential status of a segment can have a corresponding color that is different from a corresponding color for each other potential status. The potential statuses for a segment can include (i) a full status indicating that the segment does not have any available spots, (ii) an available status indicating that the segment has at least one available spot, and/or (iii) a conditional status indicating that the segment will not be confirmed until a specified number of spots on the segment are claimed.

In some aspects, the first status is the conditional status and the second status is the available status. Determining that the status of a given segment has changed from a first status to a second status can include determining that the status of the given segment is the available status. Updating the one or more visual features of the segment indicator for the given segment within the calendar interface to represent the second status can include changing a color of the segment indicator for the given segment to the corresponding color for the available status.

In some aspects, updating the one or more visual features of the segment indicator for the given segment within the calendar interface to represent the second status can include updating the segment indicator for the given segment at each client device on which the calendar interface is presented. The date range can be a given month.

Particular embodiments of the subject matter described in this specification can be implemented so as to realize one or more of the following advantages. Aspects of the platform's interfaces provide a consistent experience for the clients that allows the clients to identify suitable segments without navigating to many different interfaces or application pages. For example, a calendar interface that presents color-coded dots (or other segment indicators) that represent the different types of segments under their respective departure dates allows a user to quickly and easily identify all of the suitable segments over a given time period and to identify those that have availability. For example, by utilizing the color-coded dots to specify whether there are existing segments on each particular day, whether there is availability on those segments, and/or whether those segments are confirmed or conditional, enables the limited space of the calendar interface to convey a significant amount of information that could not otherwise be presented on the calendar interface. As such, the user interfaces discussed herein directly provide users information about segment availability and whether segments on a given day are confirmed, conditional, or full without requiring the users to navigate to multiple different user interface screens in order to obtain the information. This also prevents the users from unnecessarily navigating to a user interface for a particular day when there are no conditional and/or available segments on that day. As such, the user interfaces discussed herein provide a more efficient workflow and presentation of information to the users. Furthermore, because a user's navigation to various different user interfaces can generate a network call for more information, reducing the number of calls that a user has to make to obtain the information that they need results in a more efficient system that does not require as much data to be transferred.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
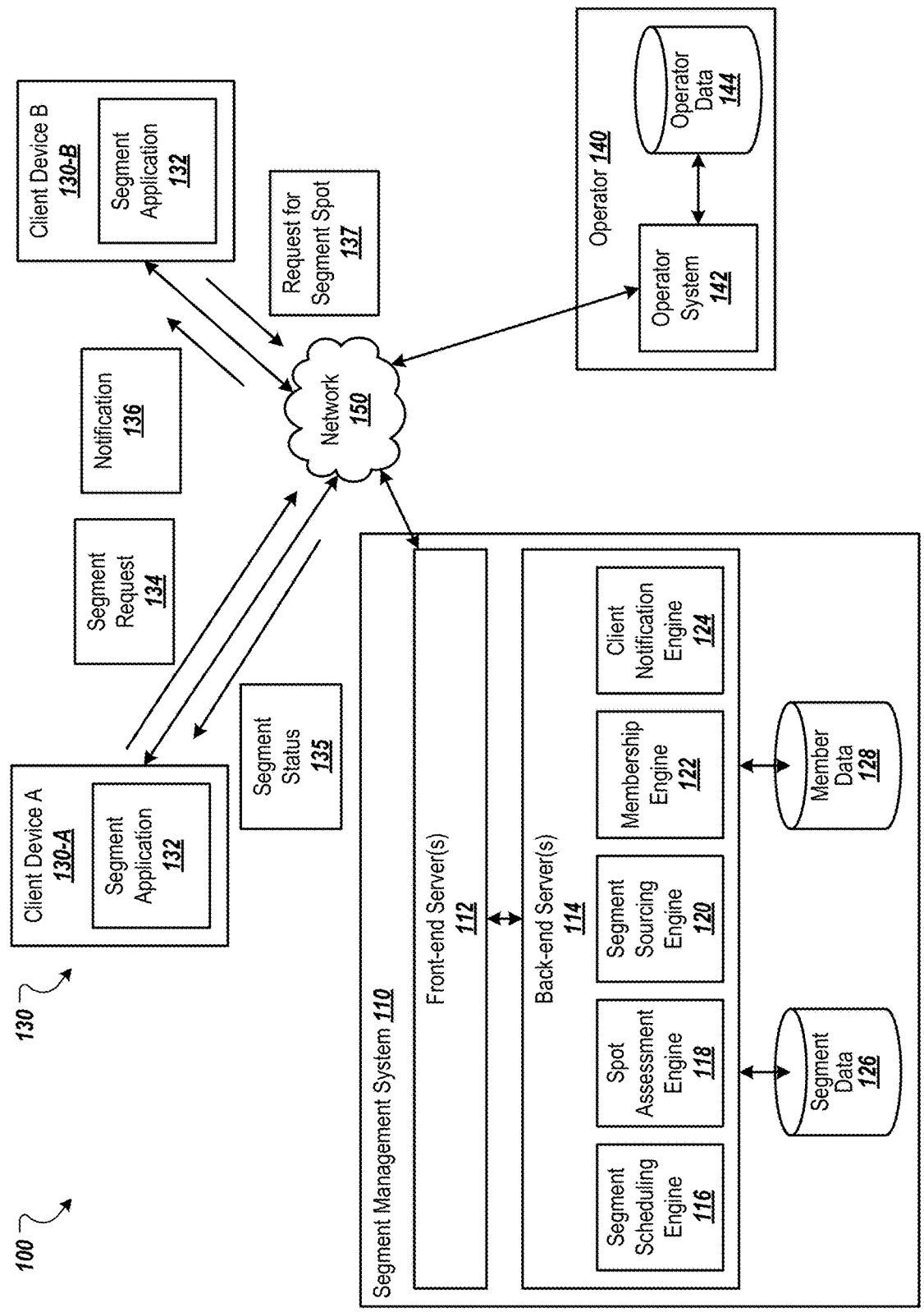
FIG. 1 is a block diagram of an example environment in which a segment management system generates, provides, and updates interfaces that enable clients to create segments and claims spots on segments.

This document describes methods, systems, devices and computer readable medium that facilitate generating, presenting, and visually updating user interfaces to show the status of segments, including client-initiated segments. As used throughout this document, a segment refers to a flight (or other mode of navigation) between an origin and a destination. The term segment refers to any type of flight that carries clients, including shuttles (e.g., a flight between a set of locations specified by the service provider) and charters (e.g., a flight between two locations freely specified by a client).

As described in detail below, the segment can be initiated by a client (e.g., a member of a service and/or a user of an application that facilitates creation of the segment), and made available to other clients, for example, by way of a native mobile application (or another appropriate interactive environment, such as a web interface). A client is a person that travels on one or more segments provided by a segment service provider. A client can be a member of a segment service provided by the segment service provider or a non-member that, for example, uses an application to claim a spot on segments and/or initiate segments. A client of the service (rather than the service provider itself) that initiates a segment is referred to herein as a creator. An example creator is a client that initiates (and customizes by specifying attributes for) a segment (e.g., a flight) over a specified route. A spot refers to seat or other appropriate area of occupancy for a client on a jet that is used for the segment.

There are multiple different types of segments that can be initiated by a client. Two types of segments are shuttles and charters. A client can initiate a shuttle by selecting a route from a pre-specified set of routes between two locations (e.g., as specified by a provider of the service). A client can initiate a charter by freely specifying both the origin and destination for the charter rather than selecting from the pre-specified set of routes. The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity.

Another type of segment is a conditional segment. A conditional segment is a segment that is initiated by a client and contingent on at least a specified number of spots being claimed by one or more other clients (or the client) before the segment will be confirmed. A segment service provider may require that at least a specified minimum number of spots are claimed before confirming the segment for the clients. The ability to initiate a conditional segment enables a client to create a segment without being responsible for all of the minimum number of spots. Instead, the segment service provider can notify other clients that the conditional segment is available and allow other clients an opportunity to claim a spot on the segment. If the clients claim at least the minimum number of spots on the segment, the segment service provider can convert the conditional segment to a confirmed segment that will be scheduled for the clients that claimed a spot on the segment. If the segment includes additional spots above the minimum number that have not been claimed, the segment service provider can make those spots available to other clients as well.

An application can present and update graphical interfaces to show the current status of various segments. An example interface is a calendar interface that presents the status of segments between two locations for a particular date range using a calendar. The calendar interface can include, for each date, zero or more segment indicators that indicate the status of existing segments that are scheduled to depart on that date. The segment indicators can be color-coded dots that are presented in different colors based on the status of the segment represented by the dot. For example, a full segment with no available spots can be presented in a first color, a confirmed segment having one or more available spots can be presented in a second color different from the first color, and a conditional segment that has not yet been confirmed can be presented in a third color different from the first and second colors. The segment indicator for each segment can be presented adjacent to, e.g., below, the departure date for the segment. For example, the calendar interface can present color-coded dots under dates for which existing segments have a departure date that matches the date. In this way, the calendar interface can convey the status of many existing segments between two locations during a date range on a small display in which there is limited space to present such information.

The visual feature(s) of the segment indicators that represent the status of the segments can be visually updated whenever the status of the segments change. Continuing the previous example, if a conditional segment is confirmed, the color of the color-coded dot that represents the conditional segment can be updated from the third color to the second color (if there are available spots on the segment) or the second color (if all spots on the segment are claimed) in response to the segment being confirmed. The color can be updated in real time, e.g., while a client is viewing the calendar interface, so that the clients have access to current status information.

FIG. 1 is a block diagram of an example environment 100 in which a segment management system 110 generates, provides, and updates interfaces that enable clients to view existing segments, create segments, and claims spots on segments. The example environment 100 includes a network 150, such as a local area network (LAN), a wide area network (WAN), the Internet, a mobile network, or a combination thereof. The network 150 connects client devices 130 (e.g., client device A 130-A and client device B 130-B) of clients, the segment management system 110, and operator systems 142 of operators 140. The example environment 100 may include many different client devices 130 and operators 140.

The segment management system 110, which can be operated and maintained by a segment service provider, allows clients to arrange transportation on segments provided by the segment service provider. The segment service provider can provide scheduled segments (e.g., scheduled shuttles) between origins and destinations using a client membership model in which clients (e.g., members of the segment service provided by the segment service provider) provide a membership submission (e.g., payment) to be eligible to claim spots on the segments.

The segment service provider can also enable the clients to initiate segments with custom attributes (e.g., custom departure date, origin, destination, and/or type of jet). For example, the segment service provider can enable the clients to initiate custom shuttles between locations specified by the segment service provider (e.g., along routes for which the segment service provider provides scheduled segments). The segment service provider can also enable the clients to initiate charters (e.g., private and/or shared) between locations freely specified by the client (e.g., along routes that the segment service provider does not provide scheduled segments).

A client can view segments, initiate and manage segments, claim a spot on a segment, manage other travel arrangements with the segment management system 110, manage their profile, and/or perform other appropriate tasks related to the segment management system 110 using a client-side segment application 132 executed on the client device 130 of the client. The segment application 132 can transmit data to, and receive data from, the segment management system 110 over the network 150. The segment application 132 can be implemented as a native application developed for a particular platform or a particular device, web browser that provides a web interface, or another appropriate type of application. The segment application 132 can be executed by the client device 130. The segment application 132 can present and detect user interactions with various interfaces that allow the client to initiate segments, view segments, and/or claim spots on segments. Some example interfaces generated and/or presented by the segment application 132 are illustrated in FIGS. 2A-2G and described below.

A client device 130 is an electronic device that is capable of requesting and receiving resources over the network 150. Example client devices 130 include personal computers, mobile communication devices (e.g., Smartphones), tablet devices, and other devices that can send and receive data over the network 150. A client device 130 typically includes a user application, such as a web browser or native application, to facilitate the sending and receiving of data over the network 150. The description that follows refers to a client device that interacts with the segment management system 110 using a native application, but the description that follows is equally applicable to interactions with web pages and/or other web-based resources. As some client devices 130 have small displays with limited space to convey information, the segment application 132 presents improved user interfaces that convey a lot of information about existing segments efficiently using the limited space (e.g., using small symbols, such as dots, to convey information that would otherwise require more space to convey).

The segment management system 110 includes one or more front-end servers 112 and one or more back-end servers 114. The front-end servers 112 can transmit data to, and receive data from the client devices 130, e.g., client device A 130-A and client device B 130-B, and operator systems 142 of operators 140 over the network 150. For example, the front-end servers 112 can provide, to the segment application 132 of a client device 130 of a client, interfaces or data for presentation with the interfaces. The front-end servers 112 can also receive data specifying interactions with the interfaces of the segment application 132, such as attributes of a segment initiated by the client. As described in more detail below, the front-end servers 112 can update the interfaces, provide new interfaces, and/or update the data presented by the interfaces based on user interactions with the segment application 132.

The front-end servers 112 can also communicate with the back-end servers 114. For example, the front-end servers 112 can identify data that is to be processed by the back-end servers 114, e.g., data specifying attributes of a client-initiated segment, and provide the data to the back-end servers 114. The front-end servers 112 can also receive, from the back-end servers 114, data for a particular client and transmit the data to the client device 130 of the particular client over the network 150.

The back-end servers 114 include a segment scheduling engine 116, a spot assessment engine 118, a segment sourcing engine 120, a membership engine 122, and a client notification engine 124. As used herein, the term engine refers to one or more data processing apparatus that perform a set of tasks. The segment scheduling engine 116 manages the creation, confirmation, and/or cancellation of segments. The segment scheduling engine 116 can receive data specifying attributes of a segment initiated by a client and create the segment within the segment management system 110. For example, a client that uses a client device A 130-A can interact with interfaces of the segment application 132 to initiate a segment (e.g., a shuttle) and specify attributes of the segment. The attributes can include a departure geographic identifier (e.g., an origin city or airport code), a destination geographic identifier (e.g., a destination city or airport code), a departure date (which can include a date and/or time) at which the segment will depart from the origin, a type of jet (e.g., light, midsize, heavy, propeller, rotorcraft, etc.), a number of spots being claimed by the client, and/or other appropriate attributes.

The application 132 can generate a segment request 134 and cause the client device A 130-A to transmit the segment request 134 to the segment management system 110 over the network 150. The segment request 134 can include one or more of the client-specified attributes. In some implementations, the segment request 134 can include all of the attributes. For example, the application 132 can cause the client device A 130-A to transmit the segment request 134 after all of the appropriate attributes have been obtained from the client. As described in more detail below, the application 132 can prompt the client for the attributes using multiple interfaces.

In some implementations, the segment request 134 includes only a portion of the attributes (e.g., less than all of the attributes required by the segment service provider). For example, the segment scheduling engine 116 can cause the application 132 to prompt the client for additional attributes or other information based on initial attributes received in the segment request 134. In a particular example, the segment request 134 can include the departure geographic identifier, destination geographic identifier, and departure date. The segment scheduling engine 116 can receive these attributes, identify what types of jets are available for travel from the origin to the destination, and provide data specifying the available types of jets to the client device A 130-A for presentation by the application 132 to the client. The client can then select from the available types of jets and the application 132 can cause the client device A to transmit data specifying the selected type of jet to the segment management system 110.

The segment scheduling engine 116 can receive the segment request 134 and create the appropriate type of segment within the segment management system 110 based on the data and the attributes received from the client device A 130-A. The segment scheduling engine 116 can also store the data for the created segment in a segment data storage unit 126. The segment data storage unit 126 can include one or more databases (or other appropriate data storage structures) stored in one or more non-transitory data storage media (e.g., hard drive(s), flash memory, etc.).

The segment data storage unit 126 can store data for each segment that is provided by the segment service provider. For example, the segment data storage unit 126 can store data for each scheduled and each client-initiated segment. The segment data storage unit 126 can store data for previously operated segments, segments scheduled by the segment service provider that have not yet departed, and/or client-initiated segments that have not yet departed.

In some implementations, the stored data can include, for each segment, one or more of a type of aircraft selected for the segment, a departure date and/or time for the segment, geographic identifiers for the origin and destination of the segment, a number of spots on the segment, a number of spots claimed on the segment, the operator that will provide the selected aircraft, a required submission provided by clients to claim a spot on the segment, whether the segment is a scheduled segment that was scheduled by the segment service provider or a client-initiated segment, identifiers for each client that claimed a spot on the segment, identifiers for clients (and a number of clients) that actually boarded the segment if the segment has departed, and/or other appropriate data about the segment. For client-initiated segments, the data can also include an identifier of the client that created the segment, whether the segment is a shuttle, a private segment (e.g., a private charter segment), or a shared segment (e.g., a shared charter segment), and/or other appropriate data for client-initiated segments.

The client notification engine 124 can notify other clients of the client-initiated segment created in the segment management system 110. In some implementations, clients can view the various segments between two locations (e.g., from an origin location to a destination location). For example, the segment application 132 can present segment indicators for existing segments between the two locations using a calendar interface. The calendar interface can include, for each date, zero or more segment indicators for each existing segment between the two locations on that date.

Each segment indicator can be a dot presented adjacent to (e.g., under, above, to one side, or around) the date in the calendar. For example, after the segment is created, a segment indicator can be presented under the departure date for the segment to represent the created segment. If a different client is viewing the calendar interface for flights from the same origin and to the same destination as the created segment, the client can see the dot for the created segment and interact with the dot or the date (e.g., by selecting the dot or the date) to view more information about the created segment and/or claim a spot on the created segment. The segment indicators can include other visual indicators, such as squares, triangles, airplane symbols, or other appropriate indicators.

The visual features of the segment indicators can be used to represent the status of the segments. In some implementations, the color of a segment indicator represents the status of the segment. For example, a first color can be used to represent a full segment, a second color different from the first color can be used to represent a confirmed segment that has one or more available spots, and a third color different from the first and second colors can be used to represent a conditional segment that has not yet been confirmed. In another example, different shading of a same color, different hatching, and/or different sizes of segment indicators can be used to represent the status of the segments. In yet another example, motion of the visual indicators can be used to represent the status of the segments, e.g., a segment with available spots can be animated to rotate or expand and contract, while full segments may not move.

The segment management system 110 and/or the segment application 132 can visually update the segment indicators for the segments in response to a change in status of the segments. For example, if a conditional segment is confirmed, the segment management system 110 can provide data specifying the updated status of the segment to the client devices 130. In a particular example, if a client is viewing a calendar interface for segments from an origin to a destination and the status of one of the segments changes, the segment management system 110 can provide data specifying the updated status of the segment to the client device 130 of the client. In response to receiving the data, the segment application 132 can update the visual feature(s) of the segment indicator for the segment to represent the updated status, e.g., by changing the color of the segment indicator.

In another example, when a client navigates the segment application 132 to the calendar interface for segments between an origin and a destination and for a particular date range, the segment application 132 can obtain, from the segment management system 110, data specifying existing segments from the origin to the destination during the particular date range. The data can also include the current status of each existing segment. The segment application 132 can use the received data to present segment indicators for each existing segment within the calendar interface and to present each segment indicator in the appropriate visual feature(s) (e.g., the appropriate color) that represents the status of the segment represented by the segment indicator.

For example, the segment application 132 can use the data to determine that a particular segment has available spots and has a particular departure date. In response, the segment application 132 can generate and present a segment indicator adjacent to the particular departure date and in the color that represents segments with available spots. If the status of the segment changes (e.g., becomes full), the segment management system 110 can send updated status data for the segment to the client device 130. In turn, the segment application 132 can visually update the segment indicator to represent full segments, e.g., by changing the color of the segment indicator to the color that represents full segments.

In another example, the segment management system 110 can generate the calendar interfaces and provide the calendar interfaces to client devices 130 in response to requests received from the client devices 130. For example, when a client navigates to an interface that presents data for segments between an origin and a destination, the segment management system 110 can generate a calendar interface for one or more date ranges and provide the calendar interfaces to the client device 130. If the client navigates to an interface of the segment application 132 that presents the calendar interface for a particular date range, the segment application 132 can present the calendar interface for the particular date range, with the segment indicators for each existing segment from the origin to the destination with a departure date within the date range.

In some implementations, presentation constraints are used to manage the way in which segment indicators are presented on calendar interfaces. The presentation constraints can ensure that the segment indicators are displayed in a consistent way and in a way that maximizes the limited space available in the calendar interface. The presentation constraints can be implemented as a set of rules that control how the segment indicators are presented within the calendar interfaces. The segment application 132 can process the rules when generating or updating a calendar interface.

An example presentation constraint can specify a maximum number of segment indicators (e.g., maximum number of color-coded dots) that can be presented in each row of segment indicators. For example, the calendar interface can include one or more rows of color-coded dots under a particular date if there are multiple existing segments for that date. If adding a new color-coded dot for a new segment to a row of color-coded dots for the particular date would exceed the maximum number of dots in a row, the segment application 132 can start a new row by presenting a color-coded dot for the new segment under (or above) the existing row of dots.

Another presentation constraint can specify a maximum number of rows of segment indicators that can be presented for any given date. For example, the space between two rows of dates may include a limited amount of space to present color-coded dots. Thus, the segment application 132 can limit the number of rows of color-coded dots between the dates. If the number of rows of dots would be exceeded by adding a new row of dots, the segment application 132 can determine to not present a dot for one or more of the segments for that date. For example, the segment application 132 can determine to remove the dot for a full segment to present a segment with availability, e.g., based on a rule that specifies that available segments have higher priority for presentation than full segments.

In some implementations, the client notification engine 124 notifies clients using push segment notifications 136. For example, the client notification engine 124 can send messages (e.g., within the application 132, via text messaging, and/or via e-mail) to the clients to notify the clients of the created segment. The messages can include code (e.g., an active link) that navigates directly to an application page within the application 132 (or to a web page in a web interface) to claim a spot on the segment. The segment application 132 can present notifications for segments using a dedicated interface. For example, the client can view notifications for segments by navigating to the interface. The notification can cause the client device 130 to present visual information (e.g., information about the segment), generate audio information (e.g., a sound that alerts the client), and/or create a tactile sensation (e.g., a vibration of the client device 130). In some implementations, the client notification engine 124 transmits the notifications 136 to clients that are likely to be interested in the created segment, e.g., based on previous segments on which the clients were passengers, the location of the clients, and/or frequent locations specified by the clients (e.g., using the application 132).

A client, e.g., the client associated with (e.g., logged into the application 132 on) the client device B 130-B, can request a spot on a client-initiated segment using the application 132. For example, the client can view more information about segments by interacting with (e.g., selecting) a segment indicator or a date in a calendar interface. In response to detecting the interaction, the segment application 132 can present an interface that shows information about the segment(s) and enables the client to claim a spot on the segment(s). In another example, the client can select a link in a push notification.

The application 132 can then generate a request for a segment spot 137 and transmit the request for the segment spot 137 to the segment management system 110. The request for the segment spot 137 can include data specifying the client that submitted the request and an identifier of the segment on which the client is requesting a spot.

The segment scheduling engine 116 can receive the request for the segment spot 137 and determine whether there is still a spot available on the segment. For example, there may not be a spot available if other clients have claimed all of the available spots. If there is still a spot available on the segment, the segment scheduling engine 116 can add the client that submitted the request for the segment spot 137 to the segment. If not, the segment scheduling engine 116 can send a notification to the client that the segment is no longer available, e.g., on an interface of the application 132.

The segment scheduling engine 116 can provide segment status notifications 135 to the client that created the segment (i.e., the creator) and/or the clients that claimed a spot on the segment. For example, the segment scheduling engine 116 can notify the creator when other clients claim a spot on the segment.

The segment sourcing engine 120 can interact with the operator systems 142 of the operators 140 to select jets for the segments and obtain information about the jets (e.g., number of spots on the jet, amounts for particular segments, range, flight time rates, etc.). For example, when the segment scheduling engine 116 creates a segment (e.g., a service provider scheduled segment or a client-initiated segment), the segment sourcing engine 120 can interact with the operator systems 142 to identify a jet of the same type as the created segment that can be used for the segment. For example, the segment sourcing engine 120 can submit a request to each operator system 142 for a jet of the type of the created segment. In response to receiving a request, the operator systems 142 can obtain data regarding available jets from their respective operator segment data storage units 144 and provide, to the segment sourcing engine 120, the information about any available jets that the operator 140 is willing to operate for the created segment (e.g., number of spots on the jet, rates for particular segments, range, etc.). If multiple operators 140 have an available jet, the segment sourcing engine 120 can select a jet for the created segment based on the information provided by the operator systems 142.

In some implementations, the front-end servers 112 of the segment management system 110 communicate with the operators systems 142 using application programming interfaces (APIs). The use of the APIs require computational power to communicate data. To reduce the amount of computational power used by the APIs, the segment management system 110 may identify a subset (e.g., less than all) of operators 140 for a particular segment and provide the request to only the operators in the subset. The segment management system 110 can identify the subset of operators based on the departure geographic identifier (e.g., identify operators that operate jets in the geographic area from which the segment will depart), previous segments provided by the operators (e.g., previously provided a jet for the same origin and destination), types of jets that the operator operates, and/or other appropriate criteria. In some implementations, communications with operators can be carried out using other communications means (e.g., phone). When the segment has been confirmed by the operator, the selected aircraft will be deployed to the origin at an appropriate time so that the selected aircraft will be available for any clients that have obtained spots (e.g., seats) on the created segment.

The membership engine 122 manages the membership of clients of the segment service provider. For example, the membership engine 122 can receive and process requests from potential clients to become members of the segment service provided by the segment service provider. The membership engine 122 can also maintain membership data for each client that becomes a member. The membership data can include a profile for each client. The profile for a client can include the name of the client, contact information for the client (e.g., an address and/or phone number), payment information, and/or other appropriate information related to the client. The profile for a client can also include a geographic identifier (e.g., name of a city, state, region, country, or other geographic identifier) for a primary geographic location for the client. The primary geographic location for the client can be a location of primary residence. For example, a client may have multiple residences, but may be requested to provide a geographic location (e.g., address) for a primary residence.

The membership data for a client can also include data identifying segments on which the client claimed a spot, if the client has claimed a spot on at least one segment. For example, a new client may have not yet claimed a spot or traveled on any segments. The membership data for each client can include, for each route, a number of times the client claimed a spot on a segment on the route.

The membership engine 122 can store the membership data for each client in a membership data storage unit 128. The membership data storage unit 128 can include one or more databases (or other appropriate data storage structures) stored in one or more non-transitory data storage media (e.g., hard drive(s), flash memory, etc.).

FIGS. 2A-2G are screenshots of example graphical interfaces for presenting data specifying the status of segments and enabling clients to claim spots on the segments. The example graphical interfaces can be generated and/or presented by the segment application 132 of FIG. 1. Clients can use the example interfaces to view information about existing segments and claim spots on the segments.

Figure 2A:
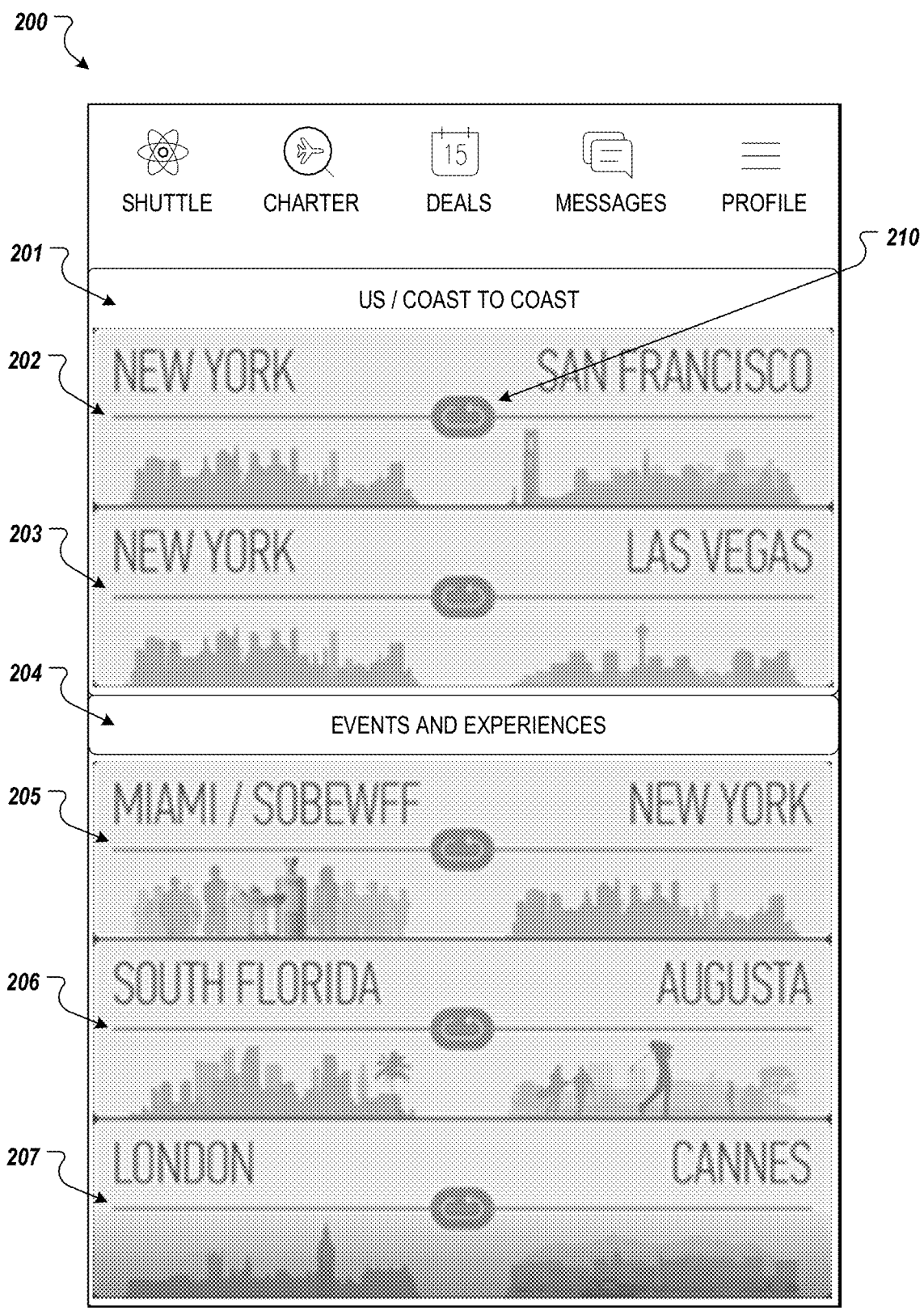
FIGS. 2A-2G are screenshots of example graphical interfaces for presenting data specifying the status of segments and enabling clients to claim spots on the segments.

FIG. 2A is a screenshot of an example route selection interface 200 that enables a client to select a route between two geographic locations (e.g., between two cities). The routes can be grouped based on various factors, e.g., geography, upcoming events, etc. In this example, a first group of routes 201 for coast-to-coast segments in the U.S. is presented near the top of the route selection interface 200. A second group of routes 204 for segments to and from geographic locations that will be hosting upcoming events is presented below the first group of routes 201. Additional groups can be presented below the second group of routes 204. A client can view the additional groups by interacting with the route selection interface, e.g., by swiping up on the route selection interface if the client device is a touch screen device.

The route selection interface 200 includes a route selection element for each route. For example, the route selection interface 200 includes a route selection element 202 for the route between New York City and San Francisco, a route selection element 203 for the route between New York City and Las Vegas, a route selection element 205 for the route between Miami and New York City, a route selection element 206 for the route between South Florida and Augusta, and a route selection element 207 for the route between London and Cannes. User interaction with a route selection element (e.g., selection of a route selection element) can cause the segment application 132 to present information about existing segments for the route represented by the route selection element. For example, if the segment application 132 detects interaction with the route selection element 202, the segment application 132 can present the example calendar interface 220 of FIG. 2B.

Each route selection element includes a route reversal element 210 that, when interacted with, swaps the origin and the destination of the route. For example, the location on the left of each route selection element can be the origin and the location on the right of each route selection element can be the destination. In this example, New York City is the origin and San Francisco is the destination for the route represented by the route selection element 202. If the client wants to view information about segments from San Francisco to New York City, the client can interact with the route reversal element 210 in the route selection element 202. In response, the segment application 132 can update the route selection element 202 to present San Francisco on the left and New York City on the right. In addition, the segment application 132 can present information about segments from San Francisco to New York City if the client interacts with the route selection element 202 while San Francisco is presented on the left and New York City is presented on the right.

Figure 2B:
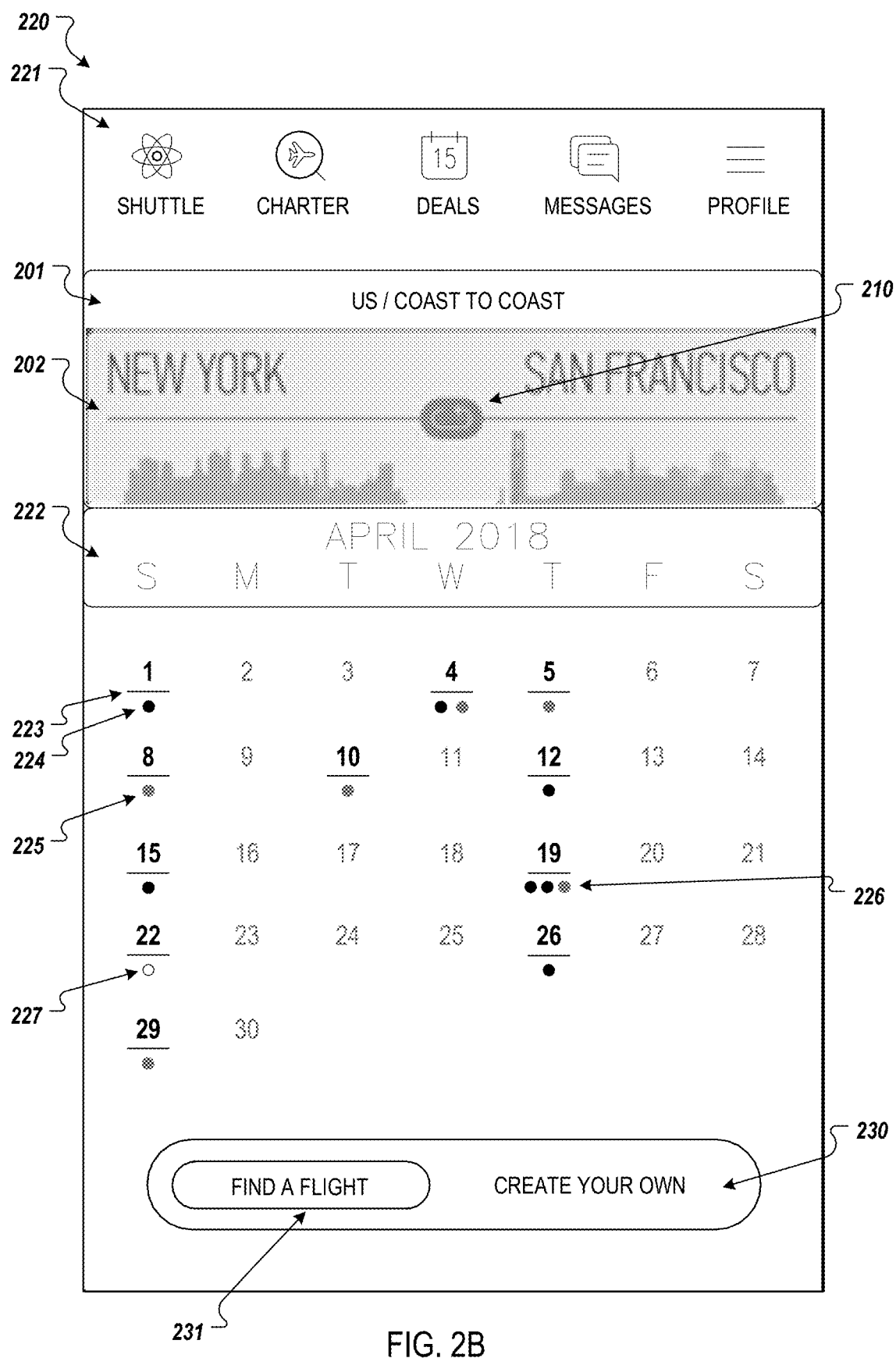

FIG. 2B is a screenshot 220 of an example calendar interface 221. As described above, the segment application 132 can present the calendar interface 221 in response to client interaction with the route selection element 202 for the route from New York City to San Francisco. The calendar interface 221 presents information about existing segments from New York City to San Francisco. If the client wants to view information about existing segments from San Francisco to New York City, the client can interact with (e.g., select) the route reversal element 210 presented in the calendar interface 220.

The calendar interface 221 includes a calendar 222 that presents the days within a month of the year. In this example, the calendar 222 is for April, 2018. For example, the segment application 132 can present a calendar 222 for the current month in response to client interaction with a route selection element. The client can then navigate to other months, e.g., by swiping left or right on the calendar 222. For example, a swipe to the right can cause the segment application 132 to present the previous month (e.g., March, 2018) and a swipe to the left may cause the segment application 132 to present the next month (e.g., May, 2018). In other examples, the calendar can present other date ranges, e.g., each week of the year, each quarter, etc.

The calendar interface 221 includes zero or more segment indicators for each day of the month. A date for which not segments are scheduled to depart may have zero segment indicators. In this example, each segment indicator is a dot that represents a particular segment from New York City to San Francisco. The segment indicators are presented under the departure date for the segment represented by the segment indicator. For example, the segment indicator 224 represents a segment from New York City to San Francisco with a departure date of Apr. 1, 2018. Dates, such as Apr. 2, 2018, for which there are no existing segments do not have a dot presented under the date.

The segment application 132 can highlight dates that have an existing segment within the calendar interface 221. For example, the dates that have an existing segment can be presented in larger text, bolder text, a different color, or a brighter color than the dates that do not have an existing segment. In this way, clients can quickly and more efficiently identify the dates with existing segments. In addition, the segment application 132 can present a bar 223 under each date that has an existing segment to further highlight the dates and to put a border between the dates and the dots that represent the segments for those dates. By presenting segment indicators under dates that have existing segments and highlighting those dates, clients can quickly identify which dates have segments without having to navigate to each date, which results in a more efficient work flow.

As described above, the visual features of the segment indicators can be used to represent the status of the segments. For example, the dots can be color-coded based on the status of the segments. In this example, a gray dot, such as the dot 225 under April 8, can represent a segment that has one or more available spots (e.g., available seats). That is, the segment represented by the dot 225 has a departure date for Apr. 8, 2018 and has one or more available spots.

A black dot, such as the dot 224 under April 1, can represent a full segment that does not have any available spots. That is, the segment represented by the dot 224 has a departure date of Apr. 1, 2018 and does not have any available spots. Similarly, a white dot, such as the dot 227 under April 26, can represent a conditional segment that has not yet been confirmed. The segment represented by the dot 227 has a departure date of Apr. 26, 2018 and is a conditional segment. The colors gray, black and white are examples. Other colors can be used to represent each status. For example, white may represent segments with availability, red may represent full segments, and gold may represent conditional segments. As described above, other visual features can be used to represent the status of segments, such as hatching, shading, etc.

If a date has more than one segment, the segment indicators can be presented in one or more rows. For example, the calendar interface 221 includes a row of three dots 226 under the date for April 19. This row of three dots indicates that there are three segments from New York City to San Francisco with a departure date of Apr. 19, 2018. In this example, two of the segments are full as they are represented by black dots and one of the segments has availability as it is represented by a gray dot.

The use of color-coded dots in combination with a calendar interface is an unconventional way to enable users to quickly and easily identify the status of segments from an origin to a destination during a relevant time period. This also reduces the number of interactions with the interface for a client to obtain the information needed, which reduces the processing load imposed on the client device's processor by the application. For example, absent this interface design, a client would have to select each date to view the shuttles on those dates and then select each segment to determine its status. This interface provides a complete overview of the availability and types of segments that exist for a particular route during a particular date range within a limited display space.

The segment indicators or the dates in the calendar interface 221 can be selectable interface controls. For example, the segment application 132 can present an interface that enables a client to claim a spot on a segment in response to selection of the segment indicator for the segment. If a date has multiple segment indicators, selection of the date or segment indicators under the date can cause the segment application 132 to present an interface that includes information about each segment and enables the client to claim a spot on one of the segments.

The calendar interface 221 also includes an interface mode control 230 that enables a client to switch between finding existing segments and creating a segment. A client can switch between interfaces for finding a segment and interfaces for creating a segment by sliding a slider bar 231 of the interface mode control 230 from one side to the other. If the client slides the slider bar 231 to the "create your own" side of the interface mode control 230 to switch to creating a shuttle, the segment application 132 can present an interface that enables the client to create a segment.

Figure 2C:
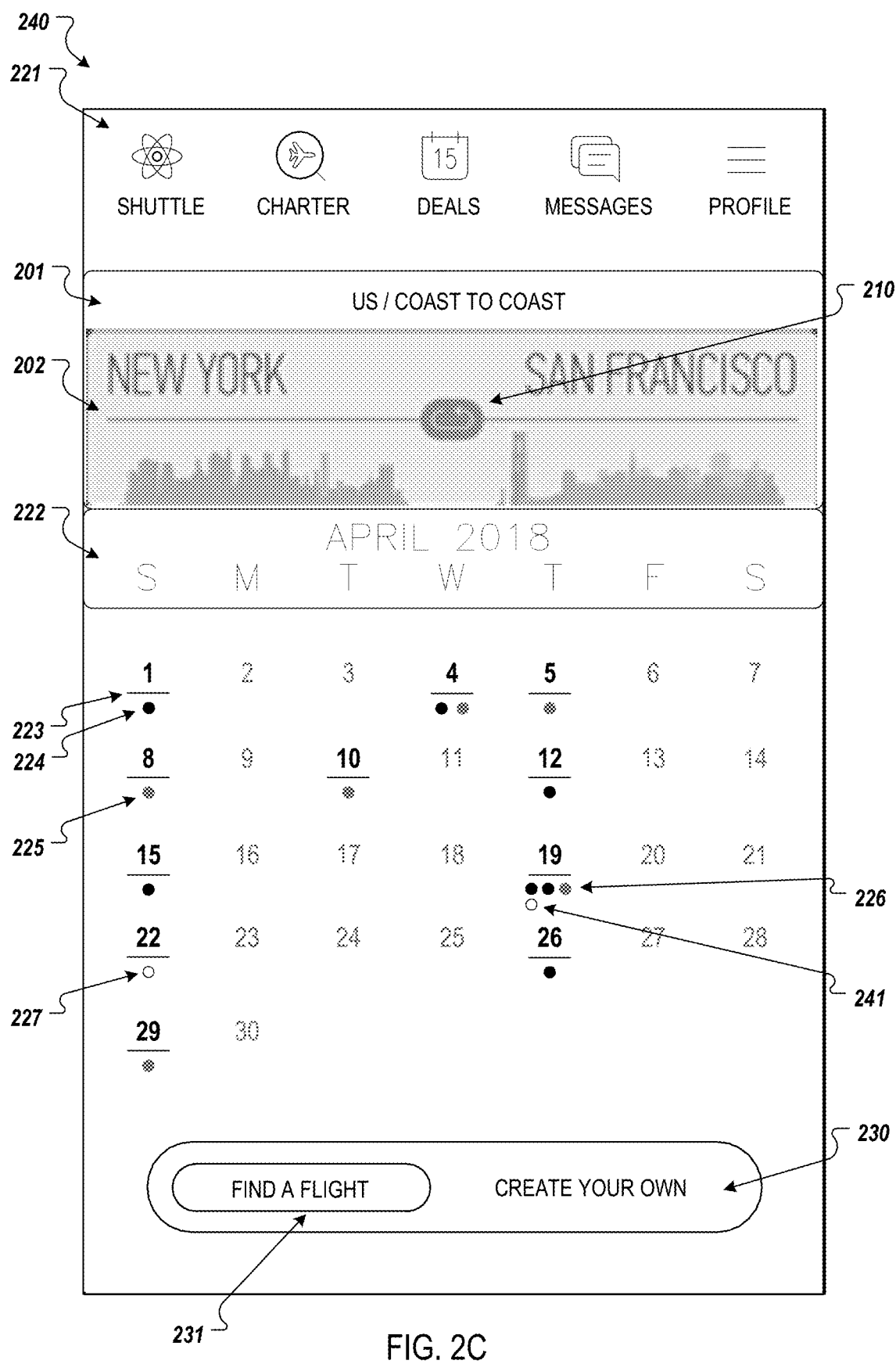

The segment application 132 can visually update the calendar interface 221 based on changes in status of a segment or the addition or removal of a segment. For example, FIG. 2C is another screenshot 240 of the calendar interface 221. In the screenshot 240, the calendar interface 221 has been updated relative to the screenshot 220. In particular, the calendar interface 221 in the screenshot 240 includes a dot 241 for a newly created conditional segment. For example, a creator different from the client viewing the calendar interface 221 may have created the conditional segment. In response, the segment management system 110 can provide data for the conditional segment to the client device of the client. The segment application 132 can visually update the calendar interface 221 to present a dot 241 for the conditional segment as shown under the date May 19, 2018. For example, the segment application 132 can update the interface 221 to include the dot 241 (as shown in the screenshot 240) while the interface 221 is being presented at the client device.

As shown in FIG. 2C, the dot has been added below the row of three dots 226. The segment application 132 can determine to start a new row of dots that includes the dot 241 based on a presentation constraint for the calendar interface 221. For example, the presentation constraint can limit the number of dots in a row to three. In this example, the dot 241 would be the fourth dot in the row 226. Thus, the segment application 132 started the new row below the row 226 to present the dot 241.

Figure 2D:
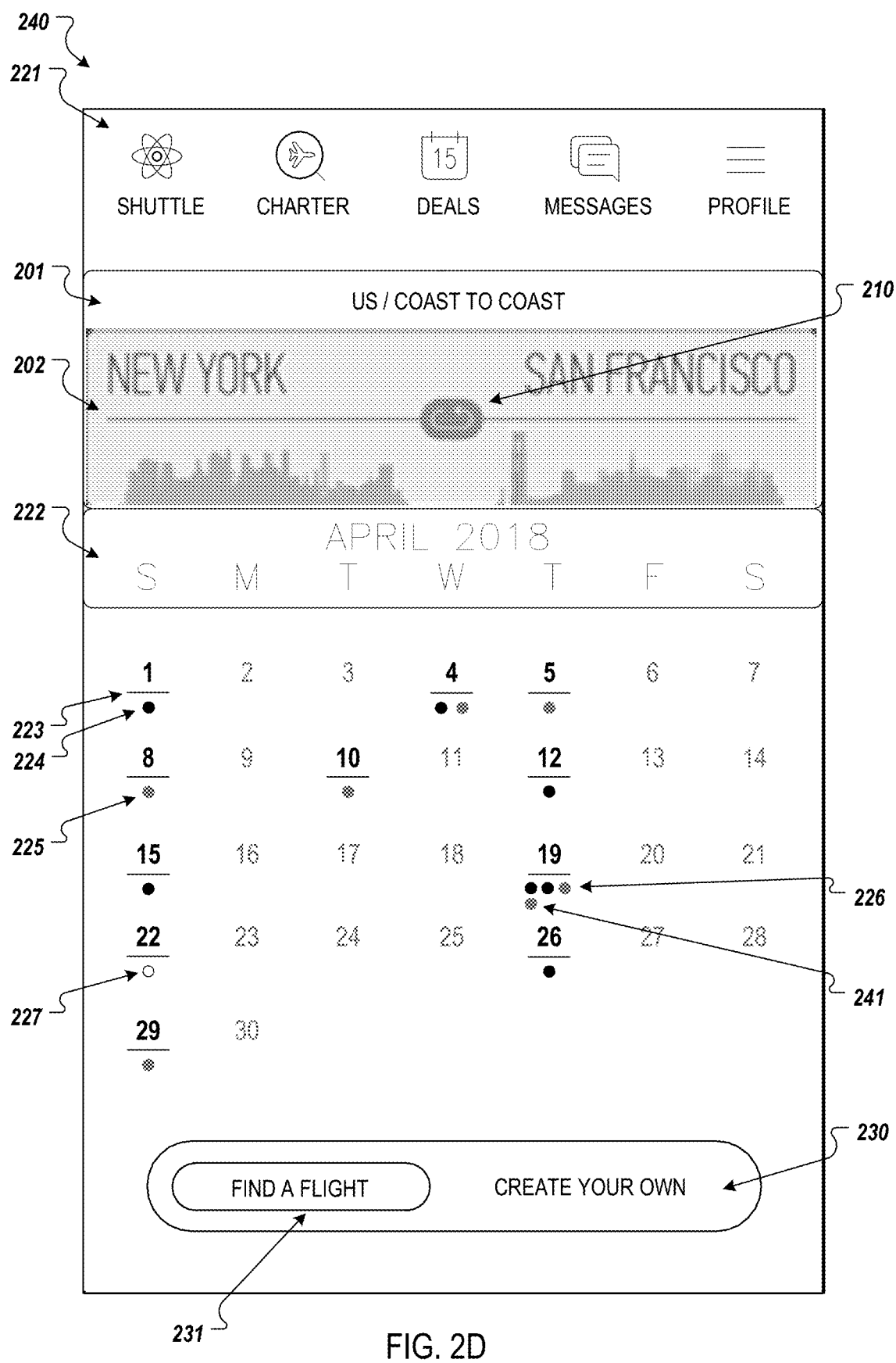

FIG. 2D is another screenshot 250 of the calendar interface 221. In the screenshot 250, the calendar interface 221 has been updated relative to the screenshot 240. In particular, the color of the dot 241 has been visually updated based on a change in status for the segment represented by the dot 241. The color has changed from white to gray indicating that the conditional segment has been confirmed, e.g., based on clients claiming the minimum number of spots on the segment for the segment to be confirmed, and that the confirmed segment has one or more available spots.

The segment management system 110 can provide, to the client device, data specifying the updated status of the segment represented by the dot 241. In response, the segment application 132 can visually update the color of the dot 241 to represent the updated status while the interface 221 is being presented at the client device.

Figure 2E:
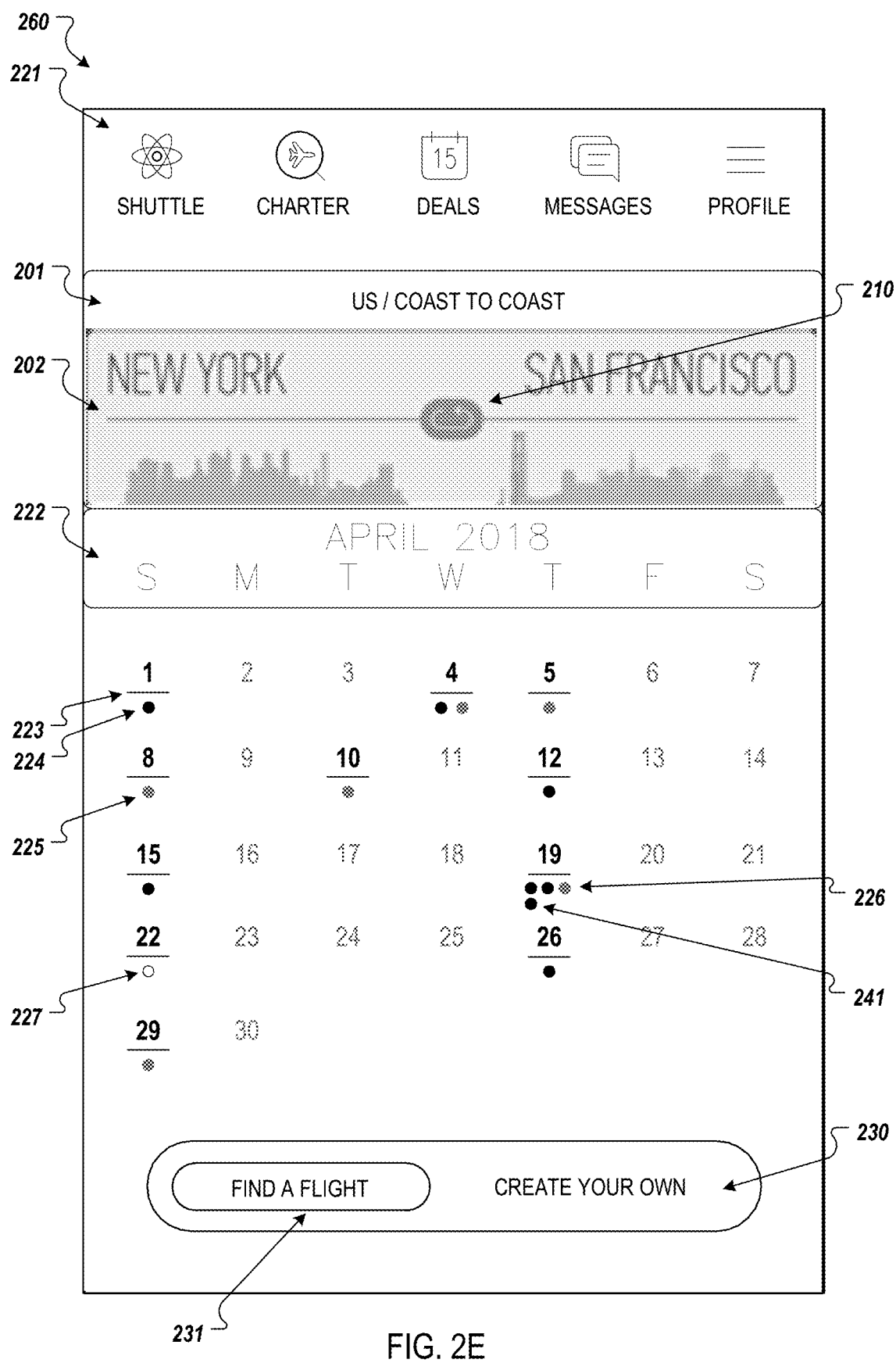

FIG. 2E is another screenshot 260 of the calendar interface 221. In the screenshot 260, the calendar interface 221 has been updated relative to the screenshot 250. In particular, the color of the dot 241 has been visually updated based on a change in status for the segment represented by the dot 241. The color has changed from gray to black indicating that the confirmed and available segment is now full. Again, the segment management system 110 can provide, to the client device, data specifying the updated status of the segment represented by the dot 241. In response, the segment application 132 can visually update the color of the dot 241 to represent the updated status while the interface 221 is being presented at the client device.

Figure 2F:
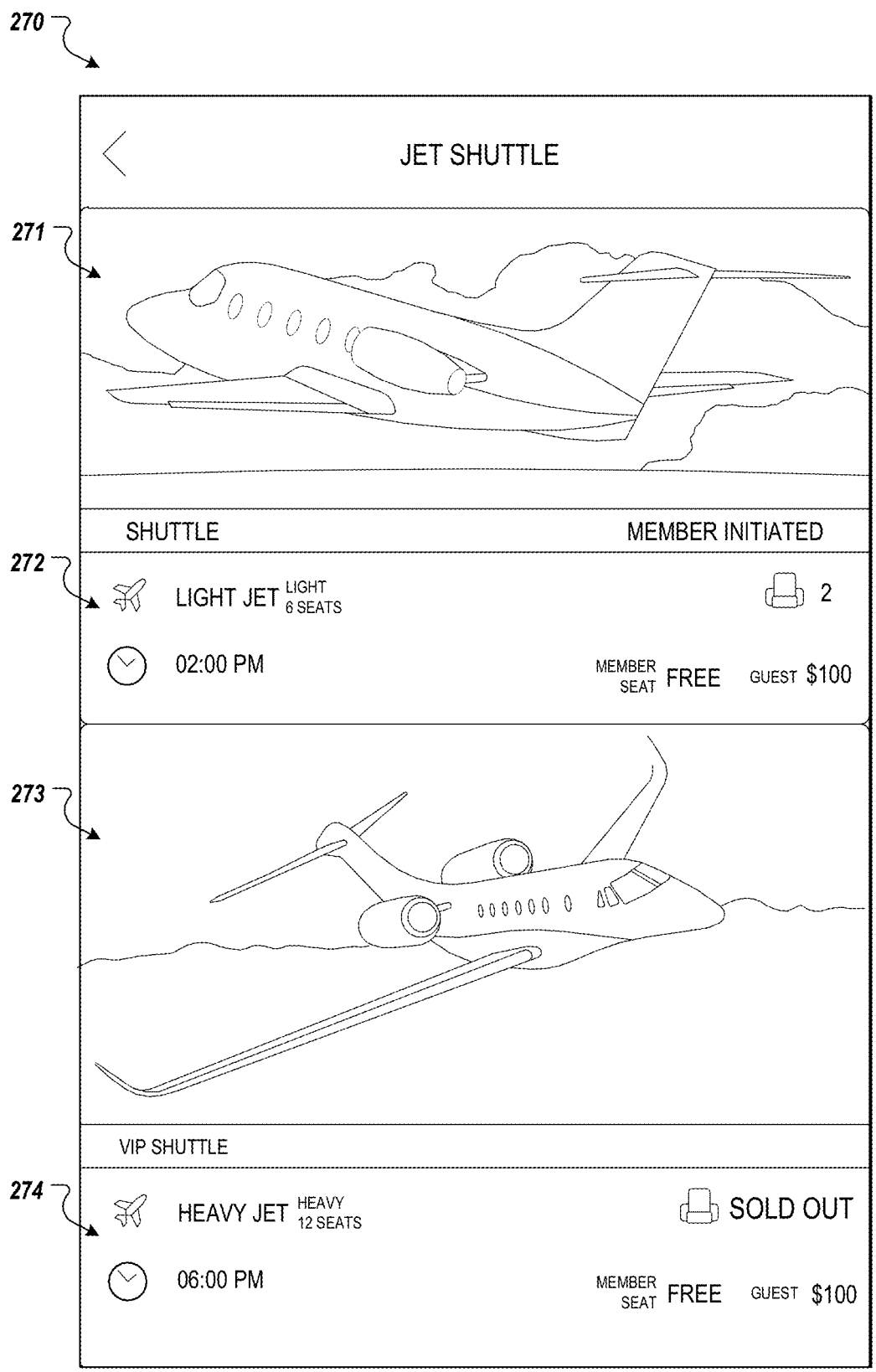

FIG. 2F is a screenshot of an example interface 270 that presents information about segments. The segment application 132 can present the interface 270 in response to detecting client interaction with one of the dates (or segment indicators) presented by the calendar interface 221. In this example, the interface 270 presents information about two segments from New York City to San Francisco with a departure date of Apr. 4, 2018 in response to client interaction with (e.g., selection of) the date April 4 in the calendar interface 221. As shown in the screenshot 260 of FIG. 2E, there is an available segment and a full segment with a departure date of Apr. 4, 2018.

The interface 270 presents information about the available segment and the full segment. In particular, the interface 270 includes a representative image 271 of the type of jet (light jet) selected for the available segment and an information element 272 that includes information about the available segment. The information includes the type of jet, the total number of spots on the segment (i.e., 6), the departure time, the number of spots available (i.e., 2), the required submission for a member to claim a spot on the segment, and the required submission for a guest of a member to claim a spot on the segment.

Similarly, the interface 270 includes a representative image 273 of the type of jet (heavy jet) selected for the full segment and an information element 274 that includes information about the available segment. The information includes the type of jet, the total number of spots on the segment (i.e., 12), the departure time, the status (i.e., sold out), the required submission for a member to claim a spot on the segment, and the required submission for a guest of a member to claim a spot on the segment.

Figure 2G:
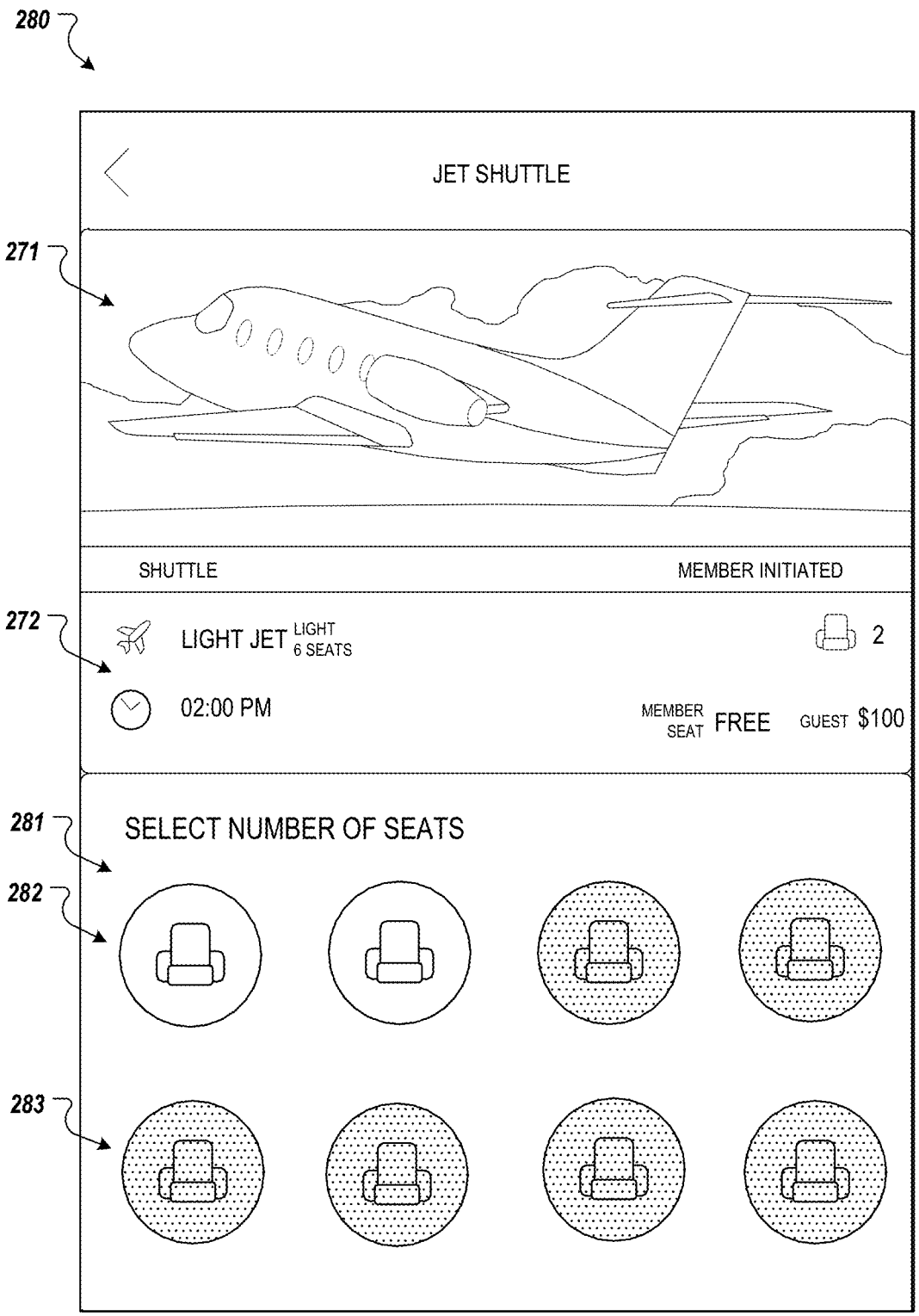

If the client wants to claim a spot on the available segment, the client can interact with (e.g., select) the image 271 or the information element 272. In response, the segment application 132 can present a spot selection interface. FIG. 2G is a screenshot of an example spot selection interface 280. The spot selection interface 280 enables the client to select the number of spots on the selected segment. The spot selection interface 280 includes the representative image 271 of the jet selected for the segment and the information element 272 for the segment.

The spot selection interface 280 also includes a spot selection element 281 that presents a spot element for each spot on the segment. For example, the spot selection element 281 includes two available spot elements 282 and four claimed spot elements 283. The claimed spot elements 283 can be presented different from the available spot elements 282 so that clients can quickly and efficiently identify available spots and select which spots the client wants to claim. For example, the claimed spot elements 283 can be presented in a different color or different shading of the same color than the available spot elements.

To claim a spot, the client can interact with one or more available spot elements 282 depending on the number of spots the client wants to claim. The client can then confirm the spots, e.g., by interacting with a confirmation icon or being prompted to provide the required submission for the spot(s).

Figure 3:
FIG. 3 is a screenshot of an example calendar interface for presenting data specifying the status of segments and required submissions for segments.

FIG. 3 is a screenshot of an example calendar interface 300 for presenting data specifying the status of segments and required submissions for segments. The segment application 132 can present the calendar interface 300 in response to client interaction with the route selection element 202 for the route from New York City to San Francisco at the route selection interface 200 of FIG. 2A. The calendar interface 300 is an alternative to the calendar interface 221 of FIG. 2B. For example, in some implementations, the segment application 132 can be configured to present the calendar interface 300 rather than the calendar interface 221 in response to client interaction with the route selection element 202.

Similar to the calendar interface 221, the calendar interface 300 includes a calendar 322 that presents the days within a month of the year. In this example, the calendar 322 is for April, 2018. For example, the segment application 132 can present a calendar 322 for the current month in response to client interaction with a route selection element. The client can then navigate to other months, e.g., by swiping left or right on the calendar 322. For example, a swipe to the right can cause the segment application 132 to present the previous month (e.g., March, 2018) and a swipe to the left may cause the segment application 132 to present the next month (e.g., May, 2018). In other examples, the calendar can present other date ranges, e.g., each week of the year, each quarter, etc.

The calendar interface 300 includes a current date indicator 323 that highlights the current date. In this example, the current date is Apr. 2, 2018 and the current date indicator 323 is a square-like outline around the current date. In other examples, the segment application 132 can highlight the current date in other ways, e.g., bold text, different color text than other dates, other outline shapes, different background color than other dates, and/or using other appropriate indicators.

The calendar interface 300 also includes an existing segment indicator 324 for each date for which one or more existing segments are scheduled to depart along the route (e.g., in this example from New York City to San Francisco) and includes at least one available spot. In this example, the existing indicator 324 is a line under the date. In other examples, the segment application 132 can indicate which dates have an available existing segment using other indicators, e.g., colored dots as described above, different shapes, different color text for the date than the text color for dates that do not have an existing segment, and/or using other appropriate indicators. The status of a segment can include, for example, whether a scheduled segment exists or doesn't exist. In other words, when there is not a scheduled segment with available seats on a given day, the status of segments on that day can be set to "not-available," whereas when there is a scheduled segment on that given day, the status of segments on that day can be set to "available." For example if the last spot on the only existing segment (or the only segment that previously had an available spot) for a date is claimed, the status of segments on that date can be updated from "not-available" to "available." When the status of segments for a given day is set to "not-available," the existing segment indicator 324 can be omitted (or hidden) from the user interface for that given day, but when the status of segments for the given day is set to "available," the existing segment indicator 324 can be presented in the user interface for that given day. In this way, the limited display space of mobile devices (and other devices) can be more efficiently utilized to allow users to quickly identify those days on which there are available segments already scheduled.

The presentation of the existing segment indicators 324 allows a client to quickly identify each date for which an existing segment is available and for which the client can claim a spot without having to navigate to interfaces for multiple dates to determine whether spots are available on those dates. In this example, the existing segment indicators 324 indicate that there are available spots on existing segments on April 2, April 4, April 5, April 12, April 15, and April 26. If the client wants to travel on one of the dates that have an existing segment indicator 324, the client can interact with the date (e.g., select the date). In response, the segment application 132 can present the interface 270 of FIG. 2F that enables the client to view information about the existing segment(s) and claim a spot on a segment. If the client wants to travel on a different date, the client can interact with the date (e.g., select the date) to initiate a new segment for that date. In response, the segment application 132 can present an interface that enables the client to initiate a new segment with custom features.

The calendar interface 300 also includes required submission elements 325 for some of the dates. Each required submission element 325 indicates the value of a required submission (e.g., payment) a client would be required to submit in order to claim a spot on a segment for that date. For example, the required submission element 325 for April $2^{nd}$ indicates that the required submission for a spot on a segment for April $2^{nd}$ would be $1530. In some implementations, the required submission elements 325 indicates the minimum required submission for their corresponding dates. For example, a particular date can have multiple segments that each have different required submission amounts. A particular date can also have a first required submission for an existing segment and a second required submission for initiating a new segment for that date.

Presenting the required submission elements 325 within the calendar interface 300 can encourage clients to create new segments on dates for which existing segments are not available. For example, the required submission element 325 for a date that does not have an existing segment can indicate the minimum required submission to initiate a segment on that date and claim a spot on the segment. By presenting the required submission for these dates, a client can quickly assess the cost for initiating a segment or compare the cost to costs required for existing segments without having to navigate to a segment initiation interface for each date of interest to the client. Presenting the required submissions for these dates also indicates to the client that traveling on these dates is possible even though an existing segment is not available for those dates. If the required submission was only presented for dates for which an existing segment was available, clients may be discouraged from interacting with the date and initiating a custom segment.

Figure 4:
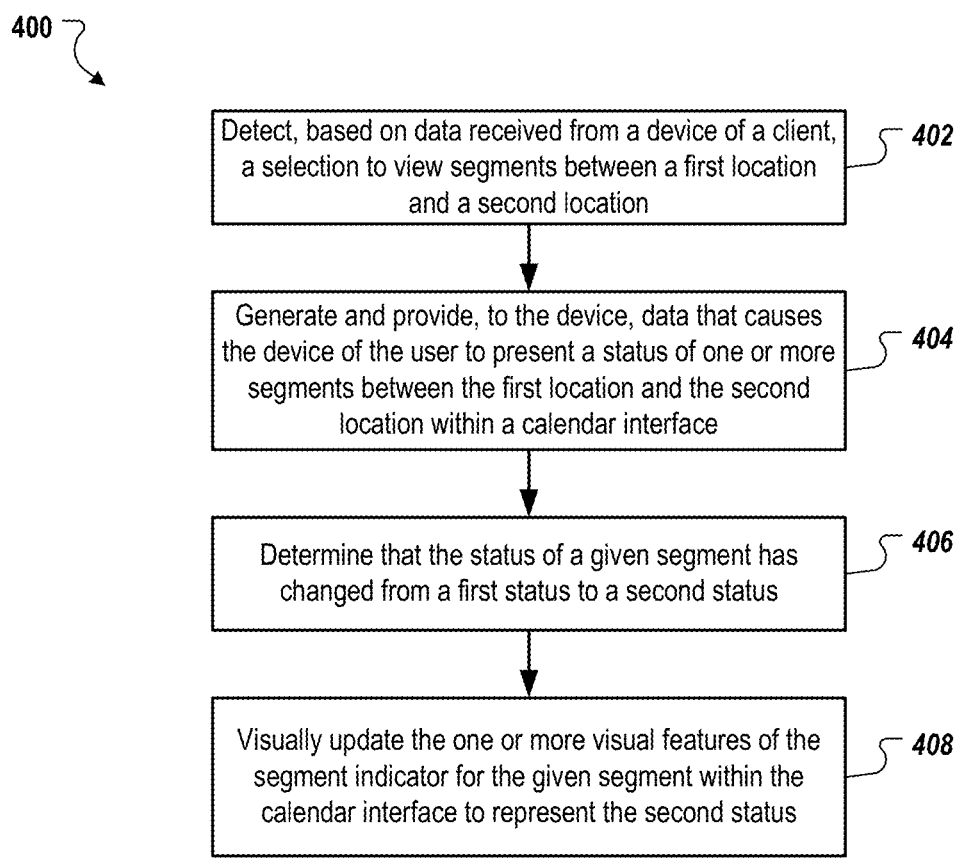
FIG. 4 is a flow chart of an example process for presenting a calendar interface that includes segment indicators for segments and visually updating the visual feature(s) of a segment in response to a change in status of the segment.

FIG. 4 is a flow chart of an example process 400 for presenting a calendar interface that includes segment indicators for segments and visually updating the visual feature(s) of a segment in response to a change in status of the segment. Operations of the process 400 can be performed, for example, by one or more data processing apparatus, such as the segment management system 110 of FIG. 1. Operations of the process 400 can also be implemented as instructions stored on a non-transitory computer readable medium. Execution of the instructions cause one or more data processing apparatus to perform operations of the process 400.

A selection to view segments between a first location and a second location is detected (402). The selection can be detected based on data received from a device of a client. For example, a client can select a route using a route selection interface, such as the route selection interface 200 of FIG. 2A. The route selection interface can be presented by a segment application, such as the segment application 132 of FIG. 1. In response to the selection, the segment application can transmit data specifying the selected route.

Data that causes the device to present a status of one or more segments between the first and second location within a calendar interface is generated and provided to the device (404). The data can include, for one or more date ranges, data identifying existing segments between the first and second location during the date range. The data can also include, for each existing segment, status data specifying the status of the segment. The status of a segment can be a full status indicating that the segment does not have any available spots, an available status indicating that the segment has at least one available spot, or a conditional status indicating that the segment is not yet confirmed (e.g., and won't be until at least a specified number of spots on the segment are claimed).

As described above, the calendar interface can include a calendar for a given data range. The calendar can present multiple dates within the date range. For example, the calendar interface can present a calendar for a month with each day of the month. An example calendar interface 221 is presented in FIGS. 2B-2E and described above.

For each date having at least one existing segment between the first and second locations, the calendar interface can include a respective non-textual segment indicator (e.g., a color-coded dot). The segment indicator for each segment can be presented using one or more visual features that represent the status of the segment represented by the segment indicator. For example, each color-coded dot can be presented in a particular color that corresponds to the status of the segment, as described above.

A determination is made that the status of a given segment has changed from a first status to a second status (406). For example, if a client claims the last available spot on a segment, the status of the segment can change from the available status to the full status. Similarly, if clients claim the minimum number of spots on a conditional segment, the status of the conditional segment can change from the conditional status to either the available status (if there is still at least one available spot on the segment) or the full status (if all of the spots on the segment are claimed).

The one or more visual features of the segment indicator for the given segment are visually updated within the calendar interface to represent the second status (408). For example, if the status of the segment changed from the available status to the full status, the visual features of the segment indicator can be visually updated from the visual features for available segments to the visual features for full segments. In a particular example, if segment indicators for available segments are white and segment indicators for full segments are red, the segment indicator for the given segment can be updated from white to red, e.g., while the calendar interface is presented at the device.

The visual features of the segment indicator for the given segment can be updated at the device of each client. If the calendar interface in which the segment indicator for the given segment is currently being presented at a device of a client, the visual features of the segment can be updated in real time while the client is viewing the calendar interface. For example, the status of the given segment can be updated at each device that recently (e.g., within a specified duration of time) requested information about segments between the first and second locations. At other devices, the updated status can be provided in response to the device requesting data for segments between the first and second locations. That is, when data is requested for a route, up to date statuses of each segment can be provided to the devices.

Figure 5:
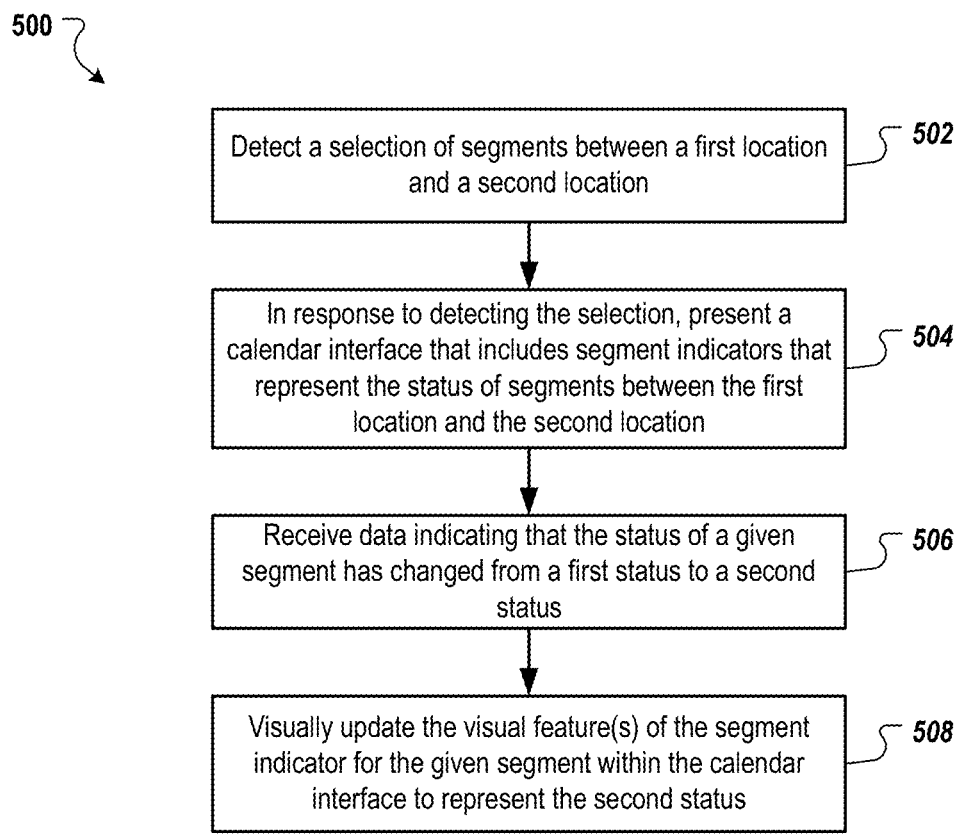
FIG. 5 is a flow chart of another example process for presenting a calendar interface that includes segment indicators for segments and visually updating the visual feature(s) of a segment in response to a change in status of the segment.

FIG. 5 is a flow chart of another example process 500 for presenting a calendar interface that includes segment indicators for segments and visually updating the visual feature(s) of a segment in response to a change in status of the segment. Operations of the process 500 can be performed, for example, by one or more data processing apparatus, such as the client device 130-A or 130-B of FIG. 1. Operations of the process 500 can also be implemented as instructions stored on a non-transitory computer readable medium. Execution of the instructions cause one or more data processing apparatus to perform operations of the process 500.

A selection to view segments between a first location and a second location is detected (502). For example, a client can select a route using a route selection interface, such as the route selection interface 200 of FIG. 2A. The route selection interface can be presented by a segment application, such as the segment application 132 of FIG. 1. The segment application can detect client interaction with a route between the first and second locations.

In response to detecting the selection, a calendar interface is generated and presented at the device (504). As described above, the calendar interface can include a calendar for a given data range. The calendar can present multiple dates within the date range. For example, the calendar interface can present a calendar for a month with each day of the month. An example calendar interface 221 is presented in FIGS. 2B-2E and described above. For each date having at least one existing segment between the first and second locations, the calendar interface can include a respective non-textual segment indicator (e.g., a color-coded dot). The segment indicator for each segment can be presented using one or more visual features that represent the status of the segment represented by the segment indicator. For example, each color-coded dot can be presented in a particular color that corresponds to the status of the segment, as described above.

Data is received that indicates that the status of a given segment has changed from a first status to a second status (506). For example, if a client claims the last available spot on a segment, the status of the segment can change from the available status to the full status. Similarly, if clients claim the minimum number of spots on a conditional segment, the status of the conditional segment can change from the conditional status to either the available status (if there is still at least one available spot on the segment) or the full status (if all of the spots on the segment are claimed). A segment management system, such as the segment management system 110 of FIG. 1 can transmit, to the device, data indicating the updated status for the given segment, e.g., in response to determining that the status has changed.

The one or more visual features of the segment indicator for the given segment are visually updated within the calendar interface to represent the second status (508). For example, if the status of the segment changed from the available status to the full status, the visual features of the segment indicator can be visually updated from the visual features for available segments to the visual features for full segments. In a particular example, if segment indicators for available segments are white and segment indicators for full segments are red, the segment indicator for the given segment can be updated from white to red, e.g., while the calendar interface is presented at the device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
one or more front-end servers that interact, over a data communication network, with devices of clients; and
one or more back-end servers in data communication with the one or more front-end servers and that include one or more data processors, the one or more front-end servers or the one or more back-end servers being configured to perform operations comprising:
detecting, based on data received from a device of a client, a selection, within a user interface presented by a display of the client device, to view segments between a first location and a second location;
visually updating the user interface to present a status of one or more segments between the first location and the second location within a calendar interface, the calendar interface including:
a calendar for a given date range that presents multiple dates; and
for each date having at least one existing segment between the first location and the second location, a respective non-textual segment indicator for each existing segment for the date, wherein each segment indicator (i) is presented using one or more visual features that represent the status of the segment represented by the segment indicator, (ii) includes an interface control that enables the client to select the segment indicator to view information about a respective existing segment, and (iii) includes a line presented under the date;
determining, based on an analysis of segment information updated continuously in real-time, that the status of a given segment has changed from a first status that indicates that the given segment is a conditional segment for which a minimum number of spots have not yet been claimed to a second status that indicates that the given segment is a confirmed segment for which the minimum number of spots has been claimed;
visually updating the one or more visual features of the segment indicator for the given segment within the calendar interface to present a visual feature that represents the second status;
determining, based on the analysis of the segment information updated continuously in real-time, that the status of the given segment has changed from the second status to a third status, the third status indicating that the given segment is not available; and
visually updating the calendar interface by removing the segment indicator from the calendar interface in response to determining that the status of the given segment has changed from the second status to the third status.

2. The system of claim 1, wherein the calendar interface includes, for at least a portion of the dates, a required submission element that presents a required submission to claim a spot on a segment for the date.

3. The system of claim 1, wherein the segment indicator for each segment is a dot presented within the calendar interface and below the date on which the segment is scheduled to depart.

4. The system of claim 3, wherein the calendar interface includes multiple dots presented below a particular date on which multiple segments are scheduled to depart, wherein the multiple dots comprise a respective dot for each of the multiple segments.

5. The system of claim 3, wherein the operations comprise providing data that causes the device to add a dot under a particular date within the calendar interface in response to client creation of a segment between the first location and the second location on the particular date.

6. The system of claim 5, wherein adding the dot under the particular date comprises:
determining that adding the dot to a row of dots under the particular date results in a number of dots presented in the row to exceed a maximum number of dots per row specified by a presentation constraint for the calendar interface; and
presenting the dot below the row of dots.

7. The system of claim 1, wherein the device of the client performs operations comprising:
detecting client interaction with a particular date; and
in response to detecting the client interaction with the particular date, presenting information for each segment scheduled to depart on the particular date.

8. The system of claim 1, wherein the one or more visual features used to present each segment indicator includes a color that represents the status of the segment, wherein each potential status of a segment has a corresponding color that is different from a corresponding color for each other potential status.

9. The system of claim 8, wherein the potential statuses for a segment include (i) a full status indicating that the segment does not have any available spots, (ii) an available status indicating that the segment has at least one available spot, and (iii) a conditional status indicating that the segment will not be confirmed until a specified number of spots on the segment are claimed.

10. The system of claim 9, wherein:
the first status is the conditional status and the second status is the confirmed status;
determining that the status of a given segment has changed from a first status to a second status comprises determining that the status of the given segment is the confirmed status; and
updating the one or more visual features of the segment indicator for the given segment within the calendar interface to represent the second status comprises changing a color of the segment indicator for the given segment to the corresponding color for the confirmed status.

11. The system of claim 10, wherein changing the color of the segment indicator for the given segment to the corresponding color for the confirmed status further comprises changing the color of the segment indicator for the given segment to the corresponding color for the confirmed status in real-time and while the calendar interface is displayed to the client on the device.

12. The system of claim 1, wherein updating the one or more visual features of the segment indicator for the given segment within the calendar interface to represent the second status comprises updating the segment indicator for the given segment at each client device on which the calendar interface is presented.

13. The system of claim 1, wherein the date range is a given month.

14. The system of claim 1, wherein visually updating the user interface to present the status of one or more segments between the first location and the second location within the calendar interface further comprises providing the data to the device that causes the device to present the status of one or more segments between the first location and the second location within the calendar interface by issuing a notification from the device that comprises at least one of generating audio information from the device and creating a tactile sensation on the device.

15. The system of claim 1, wherein detecting, based on the data received from a device of a client, the selection, within the user interface presented by the display of the client device, to view the segments between the first location and the second location further comprises determining the data received from the device of the client indicates that the client performed a swipe right or a swipe left to access one or more months including the multiple dates.

16. The system of claim 1, wherein visually updating the one or more visual features of the segment indicator for the given segment within the calendar interface further comprises:
   visually updating the one or more visual features of the segment indicator for the given segment within the calendar interface in real-time while the calendar interface is displayed to the client on the device.

17. A method, performed by one or more data processors, the method comprising:
   detecting, based on data received from a device of a client, a selection, within a user interface presented by a display of the client device, to view segments between a first location and a second location;
   visually updating the user interface to present a status of one or more segments between the first location and the second location within a calendar interface, the calendar interface including:
      a calendar for a given date range that presents multiple dates; and
      for each date having at least one existing segment between the first location and the second location, a respective non-textual segment indicator for each existing segment for the date, wherein each segment indicator (i) is presented using one or more visual features that represent the status of the segment represented by the segment indicator, (ii) includes an interface control that enables the client to select the segment indicator to view information about a respective existing segment, and (iii) includes a line presented under the date;
   determining, based on an analysis of segment information updated continuously in real-time, that the status of a given segment has changed from a first status that indicates that the given segment is a conditional segment for which a minimum number of spots have not yet been claimed to a second status that indicates that the given segment is a confirmed segment for which the minimum number of spots has been claimed;
   visually updating the one or more visual features of the segment indicator for the given segment within the calendar interface to present a visual feature that represents the second status;
   determining, based on the analysis of the segment information updated continuously in real-time, that the status of the given segment has changed from the second status to a third status, the third status indicating that the given segment is not available; and
   visually updating the one or more visual features of the segment indicator for the given segment within the calendar interface to visually present the third status by removing the segment indicator from the calendar interface.

18. The method of claim 17, wherein the segment indicator for each segment is a dot presented within the calendar interface and below the date on which the segment is scheduled to depart.

19. The method of claim 17, wherein the calendar interface includes, for at least a portion of the dates, a required submission element that presents a required submission to claim a spot on a segment for the date.

20. A non-transitory computer storage medium encoded with a computer program, the program comprising instructions that when executed by data processing apparatus cause the data processing apparatus to perform operations comprising:
   detecting, based on data received from a device of a client, a selection, within a user interface presented by a display of the client device, to view segments between a first location and a second location;
   visually updating the user interface to present a status of one or more segments between the first location and the second location within a calendar interface, the calendar interface including:
      a calendar for a given date range that presents multiple dates; and
      for each date having at least one existing segment between the first location and the second location, a respective non-textual segment indicator for each existing segment for the date, wherein each segment indicator (i) is presented using one or more visual features that represent the status of the segment represented by the segment indicator, (ii) includes an interface control that enables the client to select the segment indicator to view information about a respective existing segment, and (iii) includes a line presented under the date;
   determining, based on an analysis of segment information updated continuously in real-time, that the status of a given segment has changed from a first status that indicates that the given segment is a conditional segment for which a minimum number of spots have not yet been claimed to a second status that indicates that the given segment is a confirmed segment for which the minimum number of spots has been claimed;
   visually updating the one or more visual features of the segment indicator for the given segment within the calendar interface to present a visual feature that represents the second status;
   determining, based on the analysis of the segment information updated continuously in real-time, that the status of the given segment has changed from the second status to a third status, the third status indicating that the given segment is not available; and
   visually updating the one or more visual features of the segment indicator for the given segment within the calendar interface to visually present the third status by removing the segment indicator from the calendar interface.

* * * * *